Nov. 11, 1969 W. F. SPEER ET AL 3,477,299

DETENT SYSTEM

Filed April 1, 1968

INVENTORS
WALTER F. SPEER &
JAMES M. SIMMONS

BY Eugene M. Whitacre

ATTORNEY

United States Patent Office 3,477,299

Patented Nov. 11, 1969

3,477,299

DETENT SYSTEM

Walter F. Speer and James M. Simmons, Indianapolis, Ind., assignors to RCA Corporation, a corporation of Delaware Filed Apr. 1, 1968, Ser. No. 717,843
Int. Cl. F16h *35/18*
U.S. Cl. 74—10.41 3 Claims

ABSTRACT OF THE DISCLOSURE

An adjustable detent system for aligning the rotor and stator contacts of the rotary switches within a radio receiver tuner after final assembly of the tuner includes an index wheel secured to a tuner channel selecting shaft and a resilient detent member. One end of the resilient member engages the index wheel and the member is positioned with respect to the selecting shaft such that the contacts of the rotary swiches within the tuner are fully engaged.

This invention relates generally to television tuners and more particularly to a detent system adapted to be utilized with detent type television tuners.

In the past, where it has been necessary to index the rotatable contacts of a television tuner channel selector with respect to the stator contacts in the tuner, an index wheel and resilient detent member have been utilized. That is, an index wheel with a plurality of detents is positioned on the channel selecting shaft for rotation therewith, and a resilient detent member engages the index wheel to provide indexing of the channel selecting shaft with respect to the fixed contacts in the tuner. Once the tuner is assembled and the detent system installed, adjustment of rotary and fixed switch contacts within the tuner to insure proper contact engagement is difficult and costly. To insure proper contact engagement it has, therefore, been necessary to closely specify the tolerances of the components of the tuner.

Should the contacts within the tuner be misaligned after assembly, the tuner may not operate or may operate at other than the desired frequency and thereby necessitate rejection of the tuner or the costly procedure of reassembling a portion of the tuner. In addition, where the contacts are initially centered in the factory, more variation in the length of the resilient detent member is allowable before picture deterioration occurs because of the resulting variations in the contact engagement of the tuner rotary switches from one detent position to the next. Consequently, it is desirable to provide an adjustable detent system with an adjustment available for proper alignment of the rotor and the stator contacts of the rotary switches within the tuner after final assembly.

A detent system embodying the present invention is adapted to be utilized with a television tuner having a rotatable channel selecting shaft and an index wheel with a plurality of detents positioned on the shaft for rotation therewith. A detent member with a first and a second end has its first end resiliently engaging the index wheel to provide indexing of the channel selecting shaft. Adjustable means are secured to the detent member second end for positioning the detent member with respect to the channel selecting shaft so that relative adjustment of the fixed and rotatable contacts within the tuner can be made after final assembly.

A complete understanding of the invention may be obtained from the following detailed description of a specific embodiment thereof, when taken in conjunction with the accompanying drawings in which.

Figure 1:
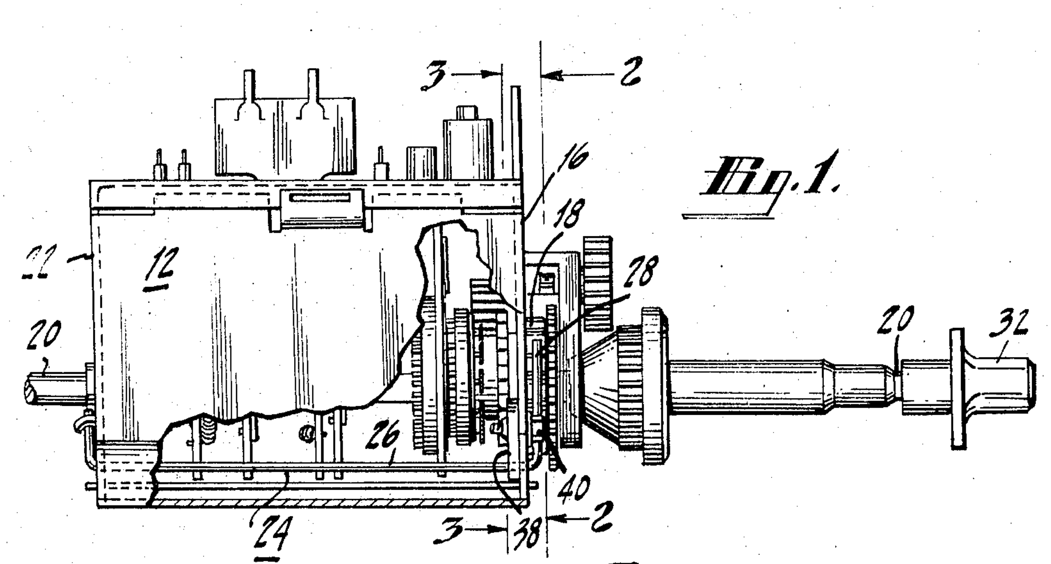
FIGURE 1 is a side view, partly broken away, of a television tuner having a detent system embodying the present invention.

Referring now to the drawings, wherein like reference numerals designate similar elements in the various figures, a television tuner 12 has a gear assembly 14 mounted on its front plate 16. The gear assembly includes an index wheel 18 having a plurality of detents and positioned on a channel selecting shaft 20. The channel selecting shaft passes through the front plate 16 and a rear plate 22. A torsion spring detent 24, including an intermediate portion 26 extending parallel to the channel selector tuner shaft 20 and a right angle portion 28, engages the index wheel 18 to cause detent action during channel change. Specifically, one end of the right angle portion 28 has a bend 30 which resiliently engages the detents of the index wheel 18.

When the tuner channel selection knob 32 is rotated, the shaft 20 to which it is joined rotates causing the index wheel 18 to rotate. This rotational motion causes a rearrangement of the electrical components within the tuner to tune it to a desired channel. The torsion spring detent 24 during the rotational movement rides on the periphery index wheel 18 thereby effectuating a detent action to provide indexing of the channel selecting shaft.

Figure 2:
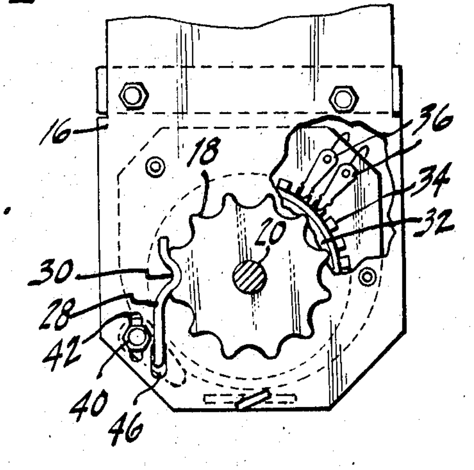
FIGURE 2 is a section view, partly broken away, of FIGURE 1 taken along the lines 2—2.

Internal to the tuner are a series of rotary switches, best shown in FIGURE 2, which interconnect the electrical components of the tuner associated with each of the detent or channel positions. The rotary switch shown in FIGURE 2 is the oscillator rotary switch of an RCA television tuner, as for example, the RCA KRK 133 tuner. (RCA Victor Television Service Data, 1967, No. T1–S1). The rotary switches, only one of which is shown, include a rotor portion 32 which is secured for rotation with the channel selecting shaft 20. On the periphery of the rotor 32 are a series of rotor contacts 34 which are adapted to engage stator contacts 36. Consequently, when the oscillator rotor is rotated to a new detent position, different ones of the rotor contacts 34 engage the stator contacts 36.

It is necessary for the proper operation of the tuner that at each detent position the rotor contacts 34 and the stator contacts 36 be in full engagement. Where the contacts within the tuner are misaligned, the tuner may not operate or may operate at other than the desired frequency causing a signal deterioration to occur. The specific positioning of the contacts wtihin the tune is determined, in part, by the indexing of the channel selecting shaft with respect to the tuner. For proper engagement, the channel selecting shaft must be indexed at the point where the rotor contacts and the stator contacts are in full engagement.

To permit a final adjustment of the rotary switch contact engagement after assembly of the tuner, an adjustment of the vertical positioning of the right angle portion 28 of the spring 24 is provided. A vertical movement of the detent torsion spring right angle portion 28 creates a rotational movement in the index wheel 18 and, hence, a rotational movement in the channel selector shaft 20. Since the rotor portion 32 of the rotary switches are secured to the channel selecting shaft, the rotational movement imparted to the index wheel 18 is transmitted to the rotor contacts 34.

Figure 3:
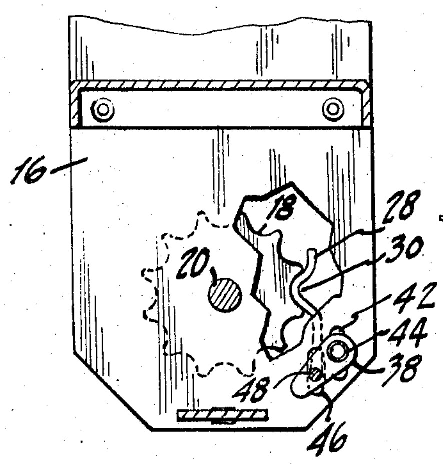
FIGURE 3 is a section view, partly broken away, of FIGURE 1 taken along the lines 3—3.

To achieve vertical movement in the detent torsion spring right angle portion 28 an adjusting plate 38, best shown in FIGURE 3, is secured to the rear side of the tuner front plate 16 by means of a mounting screw 40. The shank of the mounting screw 40 passes through a vertical clearance slot 42 in the front plate 16 and into a threaded opening 44 in the adjusting plate 38 thereby permitting a vertical adjustment in the adjusting plate 38.

The detent torsion spring 24 passes through a vertical clearance slot 46 in the tuner front plate 16 and through a bearing opening 48 in the adjusting plate 38. The opening 48 acts as a bearing surface for the torsion spring detent 24. Thus, when the channel selecting shaft 20 is rotated, the bend portion 30 in the right angle portion 28 is forced out of its detent position causing the right angle portion 28 to rotate in the bearing opening 40 through which it passes.

After the tuner has been assembled, a final adjustment is available for proper alignment of the rotor and stator contacts of the rotary switches within the tuner. The index wheel 18 may be rotated to a position such that the rotor contacts 34 and the stator contacts 36 are in full engagement. At this time, the mounting screw 40 is tightened positioning the right angle portion 28 with respect to the channel selecting shaft and thereby fixing the contact alignment.

What is claimed is:

1. In a television system of the type including a television tuner having a rotatable channel selecting shaft and an index wheel with a plurality of detents positioned on said shaft for rotation therewith, a detent mechanism comprising:

a detent member having a first end and a second end, said first end resiliently engaging said index wheel to provide indexing of said shaft; and adjustable means secured to said detent member second end for positioning said detent member with respect to said channel selecting shaft.

2. In a television tuner, a detent system comprising:

tuner chassis means having a deck portion and a pair of support elements extending perpendicularly to said deck portion;

a rotatable channel selecting shaft extending through openings in said leg portions;

an index wheel positioned on said shaft for rotation therewith and having a plurality of detents;

a single resilient member including an intermediate portion extending generally parallel to said shaft and a right angle portion, said right angle portion having a first end remote from said intermediate portion engaging said index wheel and a second end adjacent said intermediate portion; and adjustable means secured to said right angle portion second end for positioning said right angle portion with respect to said channel selecting shaft.

3. In a television tuner having fixed and rotatable switch contacts, a detent system comprising:

two chassis support elements;

a rotatable channel selecting shaft extending through openings in each of said chassis support elements;

an index wheel positioned on said shaft for rotation therewith and having a plurality of detents;

a single resilient member including an intermediate portion extending generally parallel to said shaft and passing through openings in each of said chassis support elements, one of said openings being a slot, said resilient member including a right angle portion engaging said index wheel to provide indexing of said shaft; and adjustable means, adjacent said slot, secured to said resilient member for positioning said right angle portion of said resilient member in said slot such that the fixed and rotatable switch contacts are fully engaged.

References Cited

UNITED STATES PATENTS 3,152,487 10/1964 Kennedy ---------- 74—10.41
3,406,578 10/1968 Kemeny --------- 74—10.41 X MILTON KAUFMAN, Primary Examiner U.S. Cl. X.R.

74—527